United States Patent [19]
Nürnberger

[11] Patent Number: 5,399,128
[45] Date of Patent: Mar. 21, 1995

[54] MULTI-SPEED DRIVE HUB WITH A SEPARATE MOUNTING RING FOR THE PLANETARY GEARSET FOR BICYCLES

[75] Inventor: Günter Nürnberger, Schweinfurt, Germany

[73] Assignee: Fichtel & Sachs AG, Schweinfurt, Germany

[21] Appl. No.: 14,402

[22] Filed: Feb. 5, 1993

[30] Foreign Application Priority Data

Feb. 7, 1992 [DE] Germany ............ 42 03 509.0

[51] Int. Cl.$^6$ .................. B62M 11/16; F16H 3/46
[52] U.S. Cl. ............................. 475/298; 475/299
[58] Field of Search .......... 475/283, 288, 298, 299

[56] References Cited

U.S. PATENT DOCUMENTS

| | | | |
|---|---|---|---|
| 1,058,510 | 4/1913 | Winkler | 475/288 X |
| 4,721,013 | 1/1988 | Steuer et al. | 475/299 X |
| 4,973,297 | 11/1990 | Bergles | 475/298 X |

FOREIGN PATENT DOCUMENTS

| | | |
|---|---|---|
| 165740 | 4/1950 | Austria . |
| 549570 | 6/1993 | European Pat. Off. ............ 475/298 |
| 911358 | 7/1946 | France . |
| 814982 | 9/1951 | Germany . |
| 2514418 | 10/1976 | Germany . |
| 4142867 | 7/1992 | Germany . |
| 2166502 | 5/1986 | United Kingdom . |

Primary Examiner—Dirk Wright
Assistant Examiner—Khoi Q. Ta
Attorney, Agent, or Firm—Brumbaugh, Graves, Donohue & Raymond

[57] ABSTRACT

A multi-speed drive hub for bicycles includes a hub shaft (1), a driver (7), a hub sleeve (9), as well as a planetary gear train (21) as part of the hub speed-changing transmission. The planetary gear train in turn has a planet gear carrier (17); at least one multistep planet gear (23); sun gears (25) meshing with the steps of the planet gear (23), which sun gears are selectively capable of being linked with the hub shaft (1) against rotation and an internal gear (11). Also provided are a coupling or clutching mechanism for coupling the driver with the planet gear carrier or with the internal gear as well as a speed-changing mechanism for the hub speed-changing transmission. In order to achieve quiet, low-wear running, the planet gear carrier (17) is mounted in a manner capable of rotation at the hub shaft on both sides of the planet gears (23).

20 Claims, 4 Drawing Sheets

MULTI-SPEED DRIVE HUB WITH A SEPARATE MOUNTING RING FOR THE PLANETARY GEARSET FOR BICYCLES

Specification

The invention concerns a multi-speed drive hub, that includes

- a hub shaft capable of being affixed to a bicycle frame
- a driver mounted at the hub shaft in a manner capable of rotation around an axis of rotation;
- a hub sleeve mounted at the hub shaft in a manner capable of rotation and surrounding a hub speed-changing transmission;
- a planetary gear train as part of a hub speed-changing transmission, and having.
- a planet gear carrier, elongated in the direction of the axis of rotation, which carrier, by means of a first mounting section in the region of one of its two axial ends, is mounted at the hub shaft in a manner capable of rotation around the axis of rotation;
- at least one multistep planet gear, mounted at the planet gear carrier in a manner capable of rotation;
- a sun gear assigned to each of the individual steps of the planet and meshing with these steps, the sun gear being mounted at the hub shaft in a manner capable of rotation around the axis of rotation and capable of being selectively linked with the hub shaft in a twist-resistant manner in the respective axial speed-engagement position;
- an internal gear, mounted within the hub sleeve in a manner capable of rotation around the axis of rotation, which internal gear meshes with one step of the planet gear;
- a coupling or clutch mechanism for coupling the driver with the planet gear carrier or with the internal gear;
- a speed-changing mechanism for the hub speed-changing transmission, mounted in a movable manner on the hub shaft.

Such a multi-speed drive hub is known, for instance, from DE-PS 814 982. In one form of embodiment the planet gears are two-step, in another three-step, so that respectively two and three sun gears are provided, each of which sun gears one at a time is capable of being selectively linked non-rotatably with the hub shaft. Depending on the position of the speed-changing mechanism, the flow of power proceeds, originating from the driver, via the planet gear carrier, then via the planet gears revolving about the respectively selected sun gear to the internal gear, and from the latter to the hub sleeve (high-speed speeds); the flow of power can also proceed from the driver to the planet gear carrier and from the latter directly to the hub sleeve (direct transmission); finally, the power flow can also proceed from the driver via the internal gear to the planet gears revolving about the respectively selected, locked sun gear, which planet gears in turn cause the motion of the planet gear carrier which drives the hub sleeve (mountain speeds). The planet gear carrier is thus subjected to varying mechanical loads with different power paths, depending on the nature of the load and the position of the speed-changing mechanism. In the case of the known form of embodiment, the planet gear carrier is mounted at the hub shaft solely in the region of its one axial end, which is turned toward the driver. The other axial end of the planet gear carrier is supported on a ring projection of a facing flange of the hub sleeve, in order to be able to absorb radial reactive forces of the ratchet clutch (pawl-and-ratchet mechanism). The sun gears' circumcircle diameter decreases in the direction from one axial end of the planet gear carrier to the other axial end.

Mounting the planet gear carrier on the hub sleeve in the region of the planet gear carrier's other axial end presents the disadvantage that inaccuracies—be they caused during manufacture or by the wear and tear caused by prolonged use, particularly play in the bearing between the hub sleeve and the hub shaft—directly affect the planet gear carrier mounted at the hub sleeve, so that the planet gear carrier accordingly rotates in out-of-true fashion. This may lead to increased wear and tear and to the generation of higher noise levels and higher friction losses.

A multi-speed drive hub for bicycles is known from Austrian Patent 16 57 40, in which hub in fact a planet gear carrier with two-step planet gears is provided, but in which only a single sun gear is provided, which sun gear is in constant tooth engagement with one of the two steps of the planet gear. The other step is in constant engagement with the internal gear. The other axial end of the planet gear carrier, which end is located away from the driver, is here supported via a set of planet gears by another sun gear which is capable of being selectively linked with the hub shaft in a twist-resistant manner. In other words, here the precision of the mounting of the planet gear carrier on the hub shaft—i.e., the precision of the coincidence of the momentary axis of rotation of the hub shaft during operation—depends on the exactness of the mounting of the sun gear on the hub shaft as well as on the precision of the planet gears that revolve about this sun gear. Here there is also the disadvantage that the other axial end of the planet gear carrier with its internal-gear toothing is supported on the sun gear in a pointwise manner only—i.e., via the few (say, three) planet gears; occasionally, this may lead to high surface loads of the internal gear, with elastic or plastic deformation and possibly the generation of vibrations, which once again is detrimental to the precision of the mounting.

From British Patent 21 66 502 which corresponds to DE-OS 34 40 068, a multi-speed drive hub for bicycles is known, in which the planet-gear carrier carrying two-step planet gears is mounted with its one axial end turned away from the driver on the hub shaft in a manner capable of rotation. On its other axial end, the planet gear carrier is provided with a hollow-cylinder collar which carries on its external perimeter a ratchet mechanism towards the driver. Within the collar there is a coil compression-spring, as well as part of the speed-changing mechanism for the hub speed-changing transmission, in particular a speed-change pawl or a speed-change sleeve. The other axial end is thus not mounted at the hub shaft in a manner capable of rotation, so that the planet-gear carrier is mounted at the hub shaft in a manner capable of rotation at only one of its axial ends ("floating" mount). Consequently, the planet gear carrier can undergo undesirable radial movements at its other axial end, which results in increased generation of noise and greater wear and tear. Since the collar at the other axial end is of a lesser diameter than that featured by the largest sun-gear, assembly can only be carried out in a manner such that, after at least one planet gear has been removed, the two sun gears are introduced radially inward in the planet gear carrier and are maintained there in central mountings so that thereafter the hub shaft can be pushed in, through the planet gear carrier and the sun gears. Next, the previously removed planet gear is again inserted.

A multi-speed drive hub for bicycles is known from the post-published DE-OS 41 42 867, wherein the multi-part planet gear carrier is mounted at the hub shaft in a manner capable of rotation, on only one side.

An object of the invention consists in offering a multi-speed drive hub of the kind mentioned at the outset, with improved running characteristics.

This object is achieved in that the planet gear carrier is mounted at the hub shaft in a manner capable of rotation, in the region of its other axial end, with a second mounting section. Because of this now two-sided mounting of the planet gear carrier on the hub shaft, a quieter, low-wear running of the planet gear carrier is ensured under all loading conditions.

In a preferred form of embodiment of the invention, the mounting of the second mounting section on the hub shaft is provided by means of a separate mounting ring, arranged concentrically with the axis of rotation. The separate mounting ring allows the application of a hub shaft with an approximately constant cross-section, capable of particularly economical manufacture. It is also possible to make the mounting ring with a relatively great radial ring-thickness, in a manner such that a two-sided mount of the planet gear carrier is possible even then when the free diameter of the second mounting section is at least somewhat larger than the circumcircle diameter of the largest of the sun gears, in order to thus attain the possibility of a simplified mounting process. Specifically, in that case it is possible to first push the sun gears onto the hub shaft and then the planet gear carriers.

If, as proposed in a further development of the invention, in following the abovementioned approach, the circumcircle diameter of the sun gears increases in the direction from one axial end to the other axial end of the planet gear carrier, it is also possible to pre-mount the planet gear carriers on the planet gear carrier, before the latter is pushed over the sun gears.

It is furthermore possible to provide for the mounting ring to feature a stop-section which forms an axial stop for the sun gears. In this fashion, after the sun gears are pushed on they are automatically locked in their desired position.

Preferably one provides for the mounting ring to feature a hollow-cylinder section, of which one cylinder end forms the axial stop and on whose other cylinder end a ring-flange section is formed, which ring-flange section extends radially outward, its external perimeter surface being designed as a mounting surface for the second mounting-section of the planet gear carrier. Of low weight and low material-consumption, the mounting ring is sufficiently stable to absorb the mounting forces of the planet gear carrier, which mounting forces are primarily radial by nature. In the preferred design the mounting ring is made of solid synthetic material.

It is particularly advantageous to provide for the diameter of a section of the mounting ring, which section features a mounting surface for the second mounting section of the planet gear carrier, to be larger than the circumcircle diameter of the largest of the sun gears. In this fashion the assembly becomes particularly simple, since the sequence requires solely for the mounting ring, then the sun gears, and finally the planet-gear carrier including the planet gears to be pushed onto the hub shaft, followed by axial fastening of the planet gear carrier, possibly with a pre-tensioning spring provided between the sun gears and the first mounting section of the planet gear carrier. With a compact structure, on obtains a good flow of power due to the fact that the driver is arranged on the side of the other axial end of the planet gear carrier.

In order to obtain a multiplication range equivalent to the five-speed multi-speed drive hub known from DE-OS 34 40 068 but having a greater number of speeds—i.e., having smaller speed-intervals—but without loss of efficiency and with continuing economical manufacturability, it is proposed that at least one planet gear feature at least three steps with different diameters.

In this fashion, one obtains a multi-speed drive hub in which relatively narrow speed steps are achieved by means of the three-way division of the driving-torque paths running over the planetary gearing, both in the case of mountain speeds and in the case of high-speed speeds. The gearing of the hub is comparable in its structure to a sliding-key drive, which provides several different reduction steps, by means of the selective locking of one sun gear at a time (out of a plurality of sun gears) via a thrust block. The possibility of shifting the driving-torque path outside the planetary gearing (power feed to the internal gear and/or the planet-gear carrier) makes it possible, with varying paths of power flow, to engage and shift-through the sliding-key drive two times. The principle (known in itself) of avoiding backlash by means of guard bevel-surfaces on the speed-change elements, which ensure the engagement of the coupling elements even in case of erroneous setting, is here put into practice on the sun gears. These are axially spring-loaded and are capable of giving way if the thrust block has reached an in-between position and acts in conjunction with the bevel surfaces. Since in the case of planetary drives the smallest moments of rotation occur at the sun gear, it is particularly advantageous to design this gear with the speed-change elements (thrust block).

The multi-speed hub according to the invention distinguishes itself by its quiet running, high efficiency as well as relatively low manufacturing costs and easy disassembly, particularly for repair purposes.

Below, the invention is explained with preferred examples of embodiment, using the drawing. The following is shown.

Figure 1:
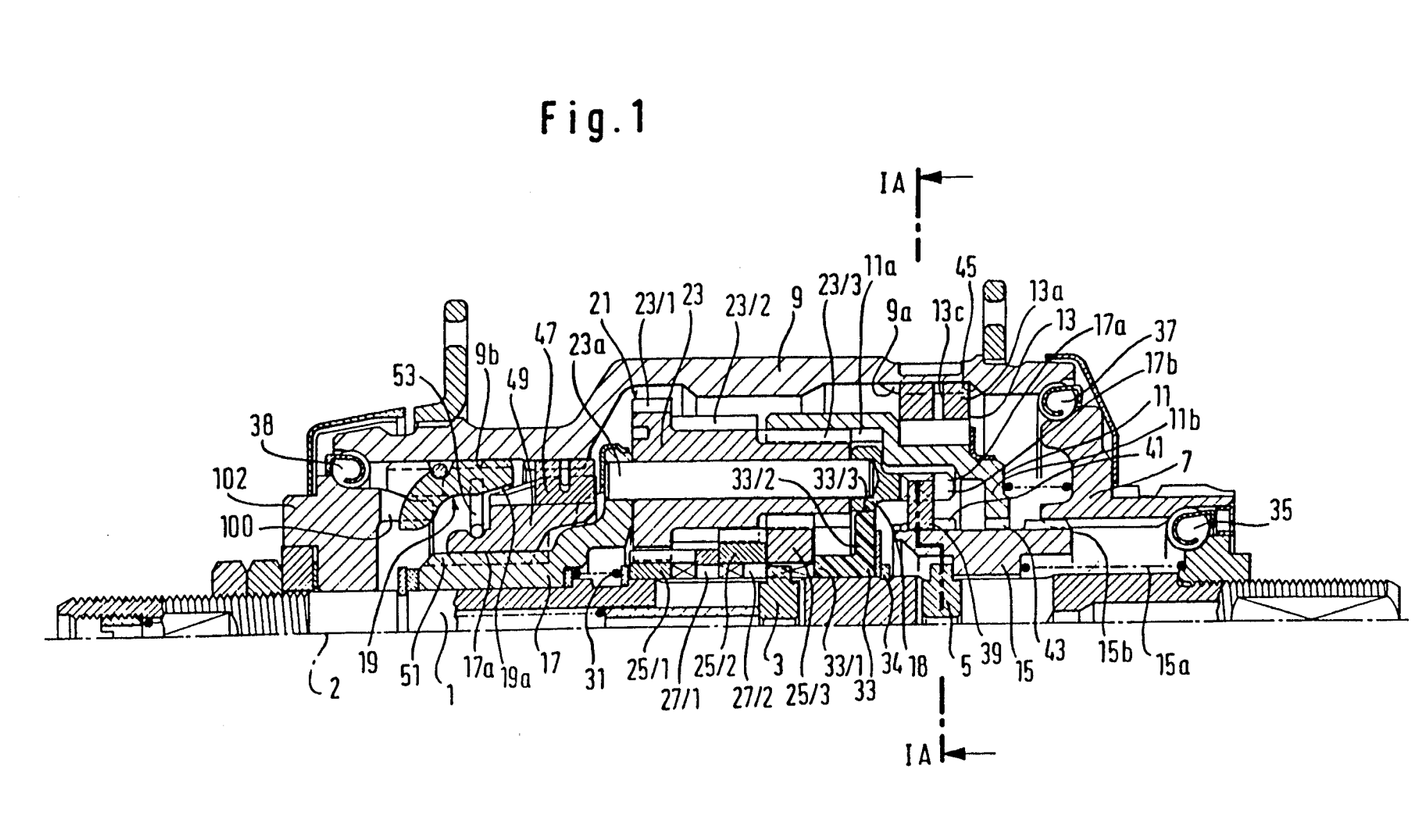
FIG. 1 a partial longitudinal section of a preferred form of embodiment of the 7-speed drive hub according to the invention, with back-pedal brake, for bicycles (section according to the line I—I in FIG. 1A)
Figure 1A:
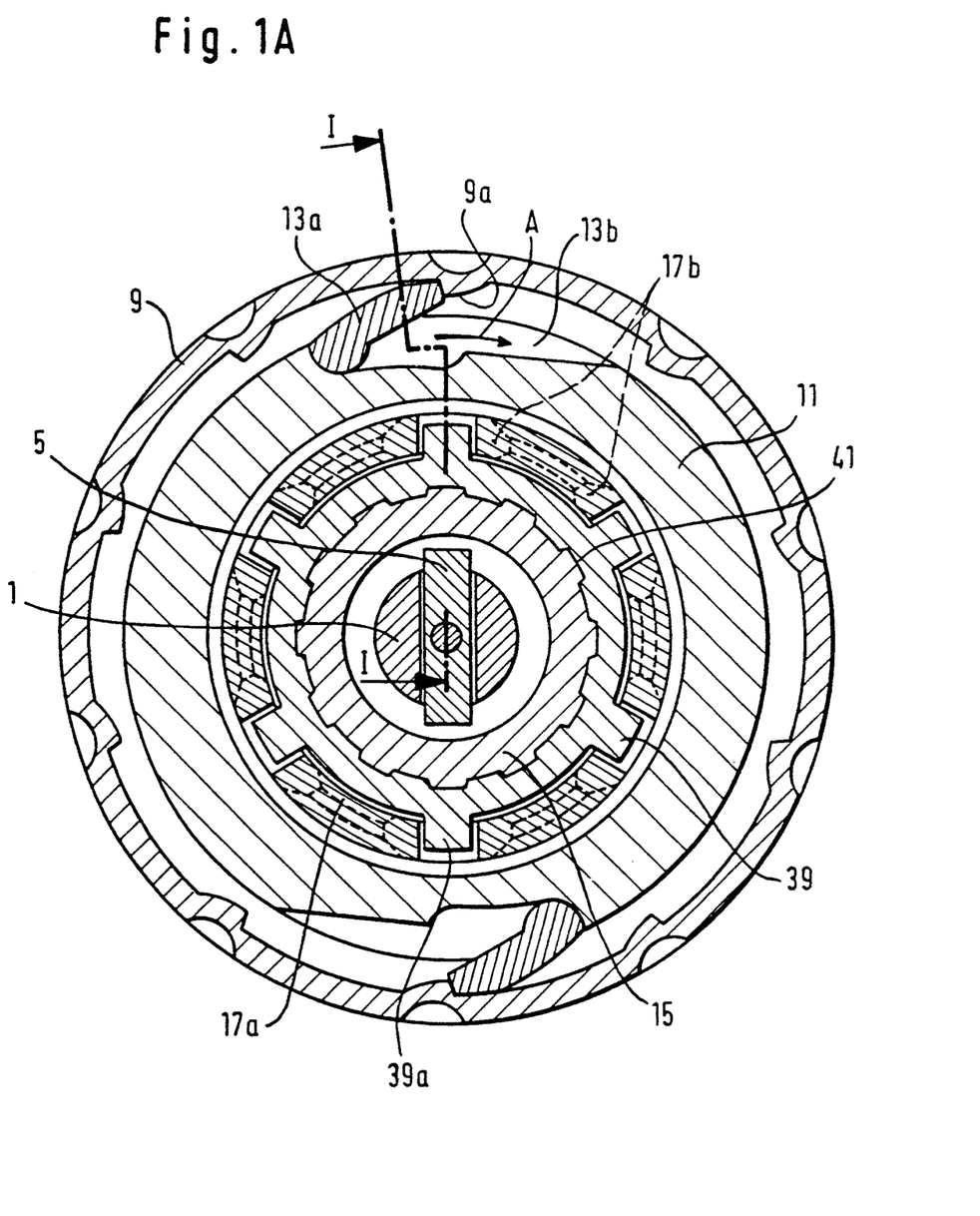
FIG. 1A a section of the multi-speed hub according to FIG. 1, following line IA—IA.
Figure 2:
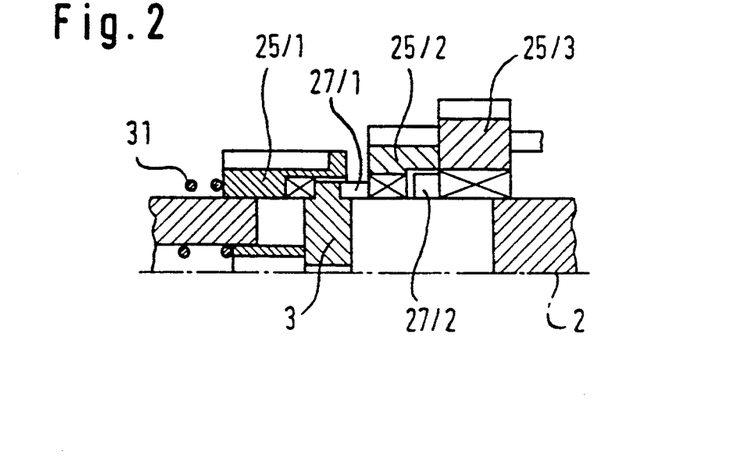
FIG. 2 a partial view of the longitudinal section of FIG. 1, in which the sun gears are represented in an interspeed position.
Figure 3:
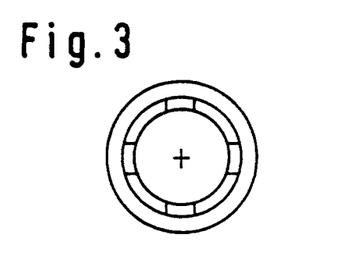
FIG. 3 the smallest sun gear, in top view.
Figure 4:
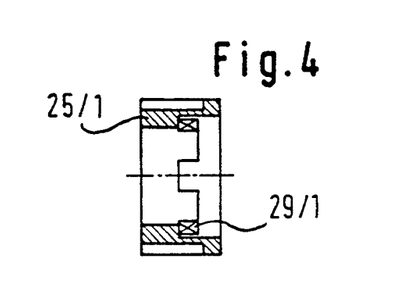
FIG. 4 a longitudinal section of this smallest sun gear.
Figure 5:
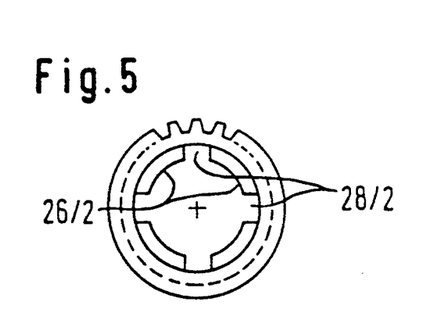
FIG. 5 the middle-sized sun gear with bevel surfaces, in top view.
Figure 6:
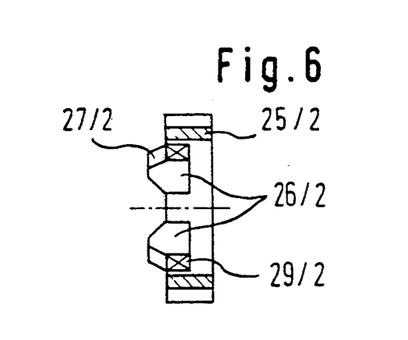
FIG. 6 a longitudinal section of the middle-sized sun gear.
Figure 7:
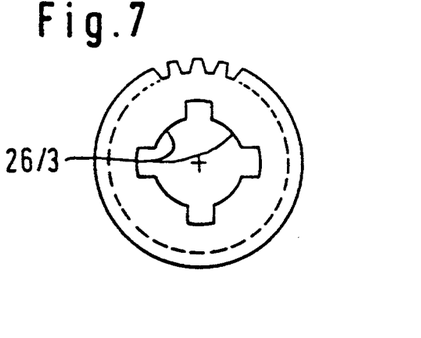
FIG. 7 the largest sun gear with bevel surfaces, in top view.
Figure 8:
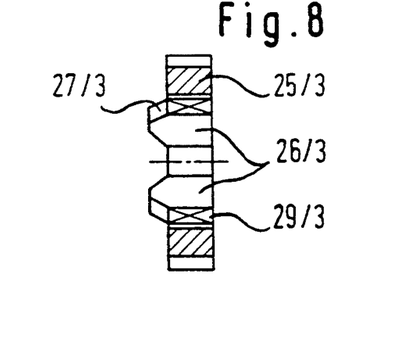
FIG. 8 a longitudinal section of the largest sun gear.

FIGS. 1 and 1A show a 7-speed drive hub with back-pedal arrangement for a bicycle, with a hub shaft 1 mounted non-rotatably on the bicycle frame (not shown), the longitudinal axis of the hub shaft defining an axis of rotation 2 of the drive hub. A driver 7 is mounted in a manner capable of rotation on hub shaft 1, via a ball bearing 35. One (or, in some cases, several) sprocket wheels (not shown) are attached to driver 7, said wheel(s) being connected via a chain to one or more sprocket wheels on the pedal-crank bearing of the bicycle. A hub sleeve 9, connected via bicycle spokes (not shown) to the bicycle wheel rim, is mounted in a manner capable of rotation on driver 7, via another ball bearing 37, in order to be thus supported on hub sleeve 9. The other end of hub sleeve 9 is mounted in a manner capable of rotation on the hub shaft, via a ball bearing 38.

Within the tubularly designed hub-sleeve 9 there are arranged a planetary gear train 21, in addition to the brake 19 which can be actuated by back-pedaling. The planetary gear train consists of an internal gear 11, a planet gear carrier 17, and one or more planet gears 23 which are distributed uniformly on a circle around axis of rotation 2, the steps 23/1, 23/2, and 23/3 of the planet gears remaining constantly in mutual tooth-engagement with sun gears 25/1, 25/2, and 25/3. An internal perimeter toothing 11a of internal gear 11 remains in constant tooth-engagement with the smallest gear-step 23/3.

The internal gear 11 is connected to the hub sleeve 9 via a freewheel. The freewheel is made up of a ratchet mechanism 13, whose pawls 13a are mounted in pawl recesses 13b of the internal gear 11, in a manner capable of swiveling around one of their ends; the pawls are pre-tensioned for their radially outwards swiveling by means of a pre-tensioning spring (not shown) that penetrates through a slit 13c of the pawls 13a. The pawls 13 operate in conjunction with embossed arrest-projections 9a of the hub sleeve 9, which arrest projections protrude radially inward, in a manner such that the hub sleeve 9 is driven by the pawls 14 whenever the internal gear 11 rotates in the drive direction (arrow A in FIG. 1A).

Figure 10:
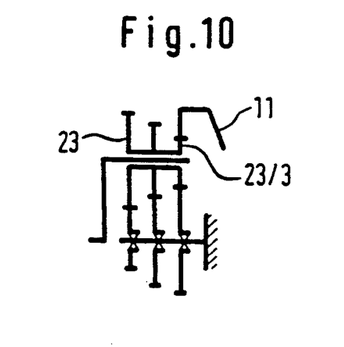
FIG. 10 a theoretical sketch of the transmission, with permanent tooth-engagement between the internal gear and the smallest step of the planet gear, in accordance with the first form of embodiment of the invention as shown in FIG. 1.

In the shown form of embodiment according to FIGS. 1, 1A and 10, the internal gear 11 meshes constantly with the smallest step 23/3 of the planet gear 23. In this configuration, one gets a multiplication range (transmission capacity) of about 240%.

Figure 11:
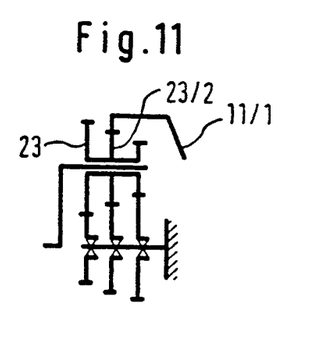
FIG. 11 a theoretical sketch corresponding to FIG. 1, but with permanent tooth-engagement between the internal gear and the middle step of the planet gear.

For certain types of bicycles, in particular those used by sports cyclists, this transmission capacity of 240% is often insufficient. In such case, a transmission design acccording to FIG. 11 has proven to be especially practical and therefore especially preferred, in which design the internal gear 11/1 remains in constant tooth-engagement with the middle step 23/2 of the planet gear 23. Here, a transmission capacity of about 285% is achieved.

Figure 12:
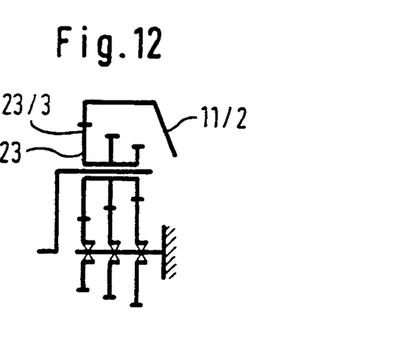
FIG. 12 a theoretical sketch similar to FIG. 10, but with permanent tooth-engagement between the internal gear and the largest step of the planet gear.

A further increase in transmission capacity, specifically to about 360%, is obtained if, according to FIG. 12, one maintains the internal gear 11/2 in constant tooth-engagement with the largest step 23/3 of the planet gear 23.

In order to shift between the various drive-torque paths, a coupling-wheel 15 is provided, which wheel is mounted at the hub shaft 1 in a manner capable of rotation and of axial translation, with pre-tensioning into a left-hand end position (shown in FIG. 1) by means of a pre-tensioning spring 15a. The coupling wheel 15 is connected to the driver 7 via a mutual slot-toothing 15b, in a manner that is twist-resistant but is capable of translation with respect to the driver in a direction parallel to the axis of rotation 2. The translation against the force exerted by spring 15a is effected via a thrust block 5, connected with speed-changing rods in a manner not shown.

Figure 9:
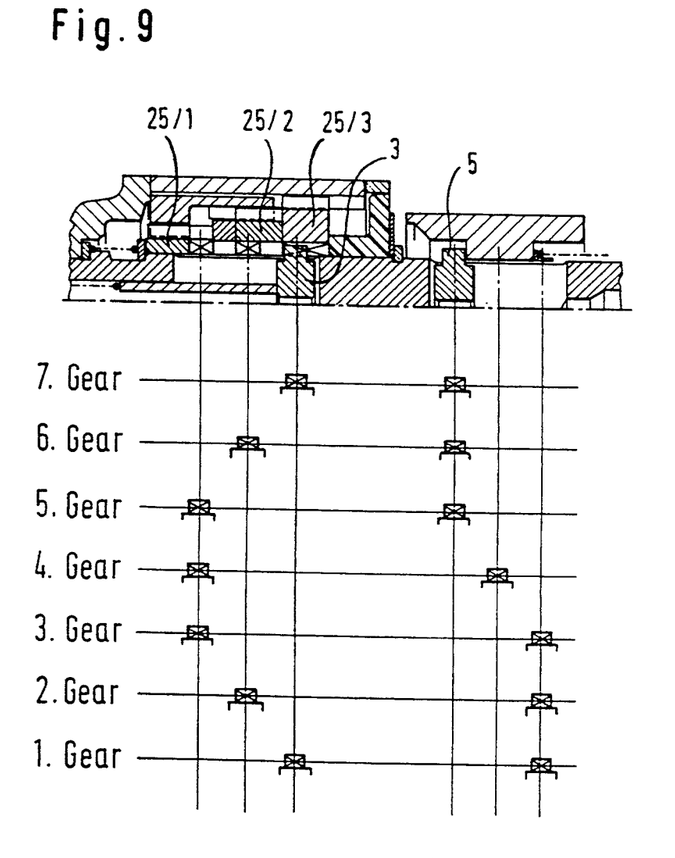
FIG. 9 a schematic representation of the speed-changing sequence in the various thrust-block settings.

In the speed-change setting shown in FIGS. 1, 1A and 9, top (7th speed=high-speed), the drive torque runs from the driver 7 via the coupling or clutch wheel 15 to a toothed star-wheel 39 which is connected to the coupling or clutch wheel 15 via a mutual slot-toothing 39 and from the toothed star-wheel to the planet gear carrier 17. This is so because, in the setting shown, the teeth 39a of the toothed star-wheel 39 are each located in a perimetral direction with respect to the axis of rotation 2 between axially protruding follower projections 17a of the planet gear carrier 17. In order to facilitate the entry and exit of the teeth 39a from the range of the follower projections 17a during speed-changes, the follower projections 17a are provided with guard bevel-surfaces 17b (indicated in FIG. 1A with dashed lines).

In other words, the flow of power runs from the driver 7 via the coupling or clutch wheel 19 to the planet gear carrier 17. The planet gear 23, driven by the planet gear carrier 17, rolls about the largest sun gear 25/3 which is then connected to the hub shaft 1 in a twist-resistant manner and thus drives the internal gear 11, since the latter remains constantly in tooth-engagement with the planet gear 23, via its smallest step 23/3. The internal gear 11, in turn, drives the hub sleeve 9 via the ratchet mechanism 13. In this case, the speed of rotation of the internal gear 11, hence of the hub sleeve 9, is always greater than that of the planet gear carrier 17, hence that of driver 7. In other words, one achieves a transmission ratio towards higher speed, the respective multiplication ratio being the greater, the larger is the sun gear that is then connected to the hub shaft 2 in a twist-resistant manner.

If by appropriately actuating the speed-change rods (not shown) the thrust block 5 is pushed to the right until the toothed star-wheel 39 comes to lie against a bottom 11b of internal gear 11, which bottom extends in a radial direction, an external toothing of coupling or clutch wheel 15 comes into engagement with a corresponding internal toothing 43 of the bottom 11b of the internal gear. In this fashion, a direct transmission is achieved (reduction ratio 1:1). This is so because the flow of power runs from driver 7 via the coupling or clutch wheel 15 directly to the internal gear 11, and from there via the ratchet mechanism 13 directly to hub sleeve 9.

If the thrust block 5 is further pushed from this middle position to its extreme right position, the internal gear is thereby driven to the right by the toothed star-wheel 39. As a consequence, the ratchet-and-pawl mechanism 13—still barely in engagement with the hub sleeve 11—is also pushed rightwards. In the course of this translation, a guard bevel-surface 45 on the inner perimeter of hub sleeve 9, indicated in FIG. 1, swivels all pawls 13a radially inwards to such an extent that these are taken out of engagement with projections 9a. The flow of power now proceeds from the driver 7 via the coupling or clutch wheel 15, the internal gear 11, the planet gears 23, the planet gear carrier 17, and a ratchet mechanism coupled with the planet gear carrier and mounted at a brake cone 49, to the hub sleeve. Said ratchet mechanism 47 is, incidentally, inoperative whenever the flow of power runs from the internal gear 11 via the ratchet mechanism 13 to the hub sleeve 9, because in that case the hub sleeve 9 rotates at a greater speed than the planet-gear carrier 17. The ratchet mechanism is then overtaken by the hub sleeve 9.

In other words, in the extreme right-hand position of the thrust block, the internal gear 11 is driven directly by the driver so that the drive hub features a reduction (mountain speeds).

In the drive hub according to the invention, as shown, the planet gears 23 feature each three mutually non-twistable steps 23/1, 23/2, and 23/3, each of which meshes with an assigned sun gear. The large step 23/1 meshes with the small sun gear 25/1, the middle step 23/2 meshes with the middle sun gear 25/2, and the small step 23/3 meshes with the large sun gear 25/3. If required, a greater number of steps and of sun gears may be used instead of three gear-steps and three sun gears.

The mountain speed with the greatest demultiplication (1st gear, according to FIG. 9) is set by locking the largest sun gear 25/3 to the hub shaft 2. By locking the middle sun gear 25/2, a smaller reduction is achieved; by locking the small sun gear 25/1, a smaller demultiplication yet.

Corresponding to the above, one obtains, in the extreme left-hand setting of the thrust block 75, the most extreme high-speed speed (7th speed, according to FIG. 9), with the greatest multiplication or step-up, when the large sun gear 25/3 is locked. By locking the sun gear 25/2 an intermediate multiplication is achieved, and by locking the small sun gear 25/3 one obtains a small high-speed multiplication.

It is only in the middle setting of the thrust block 5 (direct transmission=4th speed according to FIG. 9) that the three-step planetary gear train is practically inoperative. As is the case with the high-speed speeds (5th to 7th gears), the ratchet mechanism 27 mounted at the brake cone 49 is overtaken by the faster-running hub sleeve 9. Consequently, with direct transmission it does not matter which of the sun gears 25 is momentarily locked to the hub shaft 1 in a twist-resistant manner.

Consequently, the seven possible speeds can be selected as follows:

The 7th speed is selected by moving the thrust block 5 into the extreme left-hand setting according to FIG. 1, and by locking the large sun gear 25/3 to the hub shaft 2 in a twist-resistant manner by means of a thrust block 3. The 6th speed is selected while maintaining the drive-torque path "high-speed speed" (maintenance of the extreme lefthand position of the thrust block 5) by a translation of the thrust block 3 to the left, hence by locking the sun gear 25/2. If the thrust block is further pulled into the extreme lefthand position, the sun gear 25/1 is locked and the 5th speed is selected.

The 4th speed, as a direct-transmission speed, is reached by changing the drive-torque path from the high-speed position to the direct-transmission position. For that purpose, as already explained, one moves the thrust block into its middle setting. Again as already described, in this speed it is immaterial what the position of the thrust block 3 is, since the planetary gear train is not in operation. If the thrust block is left in its 5th-speed setting which, according to FIG. 9, corresponds to the position of the 3rd speed, it suffices to move thrust block 5 into its extreme right-hand position in order to select the 3rd speed. The 2nd and 1st speeds are shifted into by a step-by-step further pushing of thrust block 3 whereby once again sun gears 25/1, 25/2, and 25/3 are one by one locked in a twist-resistant manner to the hub shaft 1.

The result of all this is that in order to shift from one speed to the one next in sequence, only one thrust block (either thrust block 3 or thrust block 5) must be moved and only by one step. In so doing, it is possible to provide an actuating mechanism for speed-changing purposes (not shown) with a manual combination switch which—being controlled, say, by cams—can be designed to perform with slight speed-changing efforts. The speed-change paths of the two thrust blocks are ideally short, and do not overlap in time.

In order to prevent the occurrence of an out-of-gear position between the individual speed-changing steps, the sun gears 25/2 and 25/3 (FIGS. 5–8) are provided, respectively, with guard bevel-surfaces 27/2 and 27/3, as is already known from previously cited GB Patent 21 66 502. These out-of-gear positions or backlash positions between individual pedaling steps could endanger the cyclist, since under certain conditions he or she might kick through the pedal, while shifting gears or if the bicycle hub had been improperly set. The guard bevel-surface 27/3 becomes operative whenever the thrust block reaches a position between radially inwards-projecting coupling teeth 26/2 of gear 25/2 and radially inwards-projecting coupling teeth 26/3 of gear 25/3, whichever direction thrust block may come from. Because of the rotary motion of the sun gear 25/3, driven by the planet gear 23, the respective guard bevel-surface 27/3, formed on the coupling tooth 26/3, pushes the thrust block 3 in an axial direction to the left, towards the next following sun gear 25/2. Should a tooth space 28/2 between sequential coupling teeth 26/2 happen to be there, the thrust block 3 is immediately pushed into this tooth space 28/2. Should this not be the case, however, the thrust block 3 pushes the sun gear 25/2—and, with it, also the sun gear 25/1—against the resistance of a spring 31 to the left in FIG. 1, where the sun gears 25/2 and 25/1 remain under spring loading until such time as the thrust block 3 lies opposite a tooth space 28/2, so that the spring 31 can again push the sun gears 25/1 and 25/2 to the right into their operative position. The guard bevel-surfaces 27/2 on the coupling teeth 26/2 of the sun gear 25/2 operate in the same manner, causing the sun gear 25/1 to give way to the left, against the force of the spring 31.

The brake 19, which is applied by back-pedaling, is actuated by shifting the brake cone 49 in the direction of brake 19. The brake cone 49 is mounted at a first mounting section 17a at the left-hand end in FIG. 1 of the planet-gear carrier 17, specifically via a coarse thread 51. If the planet-gear carrier 17 rotates contrary to the drive direction A (cf. FIG. 1), the brake cone 49—which is held in its respective position by a friction spring 53—pushes to the left towards a counter-cone surface 19a of the brake 19, in order to then push the brake 19 in a radially outward direction against an inner-perimeter friction surface 9b of the hub sleeve 9. The brake 19, in the form of brakeshoes, is secured against rotation, via axial projections 100 of a hub flange 102 which is attached to the hub shaft 1 in a twist-resistant manner. The hub flange 102 carries the previously mentioned bearing 38.

In the drive-torque path with the high-speed transmission engaged (5th, 6th, and 7th speeds according to FIG. 9), FIG. 1 shows that the driver 7 is directly linked to the planet gear carrier 17 via the coupling wheel 15 and its toothed star-wheel 39. This means that in the 5th, 6th and 7th speeds, the braking torque is transmitted at a 1:1 ratio. In the drive-torque path of the direct transmission (4th speed) as well as in the drive-torque path of the mountain speeds (1st to 3rd speeds), the driver 7 is linked to the planet gear carrier 17 via the coupling or clutch wheel 15, the internal gear 11, and the respective locked sun gear 25/1 or 25/2 or 25/3 with the corresponding drive-torque demultiplication; in this fashion, a corresponding increase in braking force and in the resulting braking effect can be obtained.

It is also advantageous to mount the planet gear carrier 17 on the hub shaft 1 in a twofold manner which can be achieved by means of the mounting ring 33. The latter centers the planetary gear train 21 on the hub shaft which results in quieter and lower-wear running under all possible operating conditions and load conditions. The mounting ring 33 in FIG. 1 has an approximately L-shaped form. It encompasses a hollow-cylinder section 33/1, whose left-hand front end (in FIG. 1) forms an axial stop for the sun gears 25/1, 25/2, and 25/3. A ring-flange section 33/2, extending radially outward, joins the hollow-cylinder section 33/1; the outer-perimeter surface 33/3 of the ring-flange section 33/2 serves as a mounting surface for a second mounting section 18 of the planet-gear carrier 17. The diameter of the corresponding mounting-surface of the mounting section 18 which lies against the mounting surface 33/3 is slightly larger than the circumcircle diameter of the largest sun gear 25/3. Furthermore, the circumcircle diameter of the sun gears 25/1, 25/2, 25/3 decreases from sun gear to sun gear in the direction towards the left (in FIG. 1).

The assembly of the planetary gear train 21 can therefore be accomplished in a simple manner, as follows:

First, the mounting ring 33, in particular made of synthetic material, is pushed from the left onto the hub shaft 2 until it hits against a snap ring 34 inserted in a perimetral groove of hub shaft 1. Next, the three sun gears 25/1, 25/2, 25/3 are pushed in the correct order from the left onto hub shaft 1. This is followed by the mounting of the planet gear carrier 17 on which the planet gears 23 have been pre-mounted by means of planet gear shafts 23a. The planet gear carrier 17 in turn is pushed from the left onto hub shaft 1 with the interposition of spring 31 in an action in which the steps of the planet gears 23 enter into engagement with their assigned sun gears 25 and in which the preceding mounting section 18 comes to lie against the mounting surface 33/3 of the mounting ring 33.

Disassembly, for repair purposes, for example, is carried out in the reverse order.

The multi-speed drive hub described above is distinguished by a plurality of, for example, seven speed-changing steps, with speeds that—depending on the design—are closely spaced or feature wider reduction-ratio intervals. The planetary gear train used therein features several reduction steps which can be optionally selected in a manner such that in each case one of the driven sun gears can be locked. This multistep planetary gear train is combined with the usual speed-changing mechanism of a three-speed hub featuring three drive-torque paths, namely direct transmission, high-speed transmission and mountain-speed transmission. For that purpose, the driver is optionally linked to the planet gear carrier or to the internal gear of the planetary gear train. In the case of the three-step planetary gear train illustrated in the example of embodiment, one thus obtains three high-speed gears, one direct gear, and three mountain gears, which leads to a more-or-less narrowly spaced seven-speed hub. The speed-change sequence is simple since in each case a single speed-change element (speed-change block) must be moved by one step. This makes it possible to use simply designed operating elements. Finally, the hub is secured against a free kick-through of the bicycle crank and ultimately provides cost advantages, since parts of conventional three-speed or five-speed hubs can be used.

I claim:

1. A multi-speed drive hub for bicycles comprising:
  a hub shaft adapted to be affixed to a bicycle frame;
  a driver mounted on the hub shaft for rotation about an axis of rotation;
  a wheel hub sleeve mounted on the hub shaft for rotation about the axis of rotation;
  a hub speed-changing transmission received on the hub shaft within the wheel hub sleeve and including a planetary gear train, the planetary gear train including
  an axially elongated planet gear carrier having a first axial end and a second axial end, a first mounting portion proximate to the first axial end and received on the hub shaft for rotation about the axis of rotation, a second mounting portion proximate to the second end and received on the hub shaft for rotation about the axis of rotation, the second mounting portion being mounted on the hub shaft by means of a separate mounting ring arranged concentrically with the axis of rotation, and at least one multi-step planet gear mounted on the planet gear carrier for rotation,
  a sun gear corresponding to and meshing with each of the steps the planet gear, each sun gear being mounted on the hub shaft for rotation about the axis of rotation and being adapted to be selectively coupled to the hub shaft against rotation about the axis of rotation in a respective axial speed-engagement position, and
  an internal gear mounted within the wheel hub sleeve for rotation about the axis of rotation, which internal gear meshes with one step of the planet gear;
  coupling means for selectively coupling the driver with the planet-gear carrier or with the internal gear; and
  a speed-changing mechanism for the hub speed-changing transmission, the speed-changing mechanism being mounted for movement relative to the hub shaft.

2. A multi-speed drive hub according to claim 1, wherein the mounting ring includes a stop section which forms an axial stop for the sun gears.

3. A multi-speed drive hub according to claim 2, wherein the mounting ring includes a hollow-cylinder section having a first cylinder end forming the axial stop and a second cylinder end, the second cylinder end having a ring flange section extending radially there-from, and the ring flange section having an outer perimeter surface forming a mounting surface for the second mounting portion of the planet gear carrier.

4. A multi-speed drive hub according to claim 1, wherein the diameter of a section of the mounting ring receiving the second mounting portion of the planet gear carrier is larger than the diameter of the largest of the sun gear steps.

5. A multi-speed drive hub according to claim 4 wherein the diameters of the sun gear steps increases in the direction from the second axial end to first axial end of the planet-gear carrier.

6. A multi-speed drive hub according to claim 1, wherein the hub shaft has a stop surface engageable by a side of the mounting ring that faces away from the sun gears.

7. A multi-speed drive hub according to claim 1 wherein the driver is located adjacent to the second axial end of the planet-gear carrier.

8. A multi-speed drive hub according to claim 1, wherein said at least one planetary gear has at least three steps with different diameters.

9. A multi-speed drive hub according to claim 8, wherein a first step of said at least one planetary gear, which first step has the largest diameter, is in constant engagement with a first sun gear, which first sun gear is received on the hub shaft for rotation about the axis of rotation, a second step, which second step has an intermediate diameter, is in constant engagement with a second sun gear, which second sun gear is received on the hub shaft for rotation about the axis of rotation, and a third step, which third step is of the smallest diameter, is in constant engagement with a third sun gear, which third sun gear is received on the hub shaft for rotation about the axis of rotation.

10. A multi-speed drive hub according to claim 9, wherein the speed-changing mechanism includes a coupling member adapted to provide selective actuation of the sun gears so as to couple them non-rotatably with the hub shaft, whereby in the speed-engagement position of each of the sun gears, the other sun gears assume an axial freewheeling positions.

11. A multi-speed drive hub according to claim 10, wherein the coupling member includes a thrust block which is mounted on the hub shaft for movement parallel to the axis of rotation, which thrust block is shiftable among the sun gears so as to couple non-rotatably a respective sun gear to the hub shaft.

12. A multi-speed drive hub according to claim 8 wherein the third step of said at least one planet gear is in constant engagement with the internal gear.

13. A multi-speed drive hub according to claim 8, wherein the second step of said at least one planet gear is in constant engagement with the internal gear.

14. A multi-speed drive hub according to claim 8, wherein the first step of said at least one planet gear is in constant engagement with the internal gear.

15. A multi-speed drive hub according to claim 1, wherein each of the sun gears has a radial coupling recess on an inner perimeter surface.

16. A multi-speed drive hub according to claim 1, wherein one of the sun gears is biased by a compression spring in a first direction parallel to the axis of rotation, and the remaining sun gears follow the one sun gear and have on sides that face the compression spring guard bevels which operate conjointly with the thrust block.

17. A multi-speed drive hub according to claim 16, wherein the compression spring allows said one sun gear temporarily to be moved against the bias of the compression spring, whenever the thrust block is pushed by the guard bevel of the next following sun gear between said one sun gear and said next following sun gear, and the compression spring allows both said one sun gear and said next following sun gear to move against the bias of the compression spring whenever the thrust block is pushed by the guard bevel of the sun gear that follows said next following sun gear between said next following sun gear and the sun gear that follows said next following sun gear.

18. A multi-speed drive hub for bicycles comprising:
a hub shaft adapted to be affixed to a bicycle frame;
a driver mounted on the hub shaft for rotation about the axis of rotation;
a wheel hub sleeve mounted on the hub shaft for rotation about the axis of rotation;
a hub speed-changing transmission received on the hub shaft within the wheel hub sleeve and including a planetary gear train, the planetary gear train including
an axially elongated planet gear carrier having a first axial end and a second axial end, a first mounting portion proximate to the first axial end and received on the hub shaft for rotation about the axis of rotation, a second mounting portion proximate to the second end and received on the hub shaft for rotation about the axis of rotation, the second mounting portion being mounted on the hub shaft by means of a separate mounting ring arranged concentrically with the axis of rotation, and at least one multi-step planet gear mounted on the planet gear carrier for rotation,
a sun gear corresponding to and meshing with each of the steps the planet gear, each sun gear being mounted on the hub shaft for rotation about the axis of rotation and being adapted to be selectively coupled to the hub shaft against rotation about the axis of rotation in a respective axial speed-engagement position, one of the sun gears being biased by a compression spring in a first direction parallel to the axis of rotation, and the remaining sun gears following the one sun gear and having on sides that face the compression spring guard bevels which operate conjointly with the thrust block, and
an internal gear mounted within the wheel hub sleeve for rotation about the axis of rotation, which internal gear meshes with one step of the planet gear;
coupling means for selectively coupling the driver with the planet-gear carrier or with the internal gear; and
a speed-changing mechanism for the hub speed-changing transmission, the speed-changing mechanism being mounted for movement relative to the hub shaft.

19. A multi-speed drive hub according to claim 18, wherein the compression spring allows said one sun gear temporarily to be moved against the bias of the compression spring, whenever the thrust block is pushed by the guard bevel of the next following sun gear between said one sun gear and said next following sun gear, and the compression spring allows both said one sun gear and said next following sun gear to move against the bias of the compression spring whenever the thrust block is pushed by the guard bevel of the sun gear that follows said next following sun gear between said next following sun gear and the sun gear that follows said next following sun gear.

20. A method of assembling a multi-speed drive hub, the drive hub having a hub shaft adapted to be affixed to a bicycle frame;

a driver mounted on the hub shaft for rotation about the axis of rotation;

a wheel hub sleeve mounted on the hub shaft for rotation about the axis of rotation;

a hub speed-changing transmission received on the hub shaft within the wheel hub sleeve and including a planetary gear train, the planetary gear train including an axially elongated planet gear carrier having a first axial end and a second axial end, a first mounting portion proximate to the first axial end and received on the hub shaft for rotation about the axis of rotation, a second mounting portion proximate to the second end and received on the hub shaft for rotation about the axis of rotation, the second mounting portion being mounted on the hub shaft by means of a separate mounting ring arranged concentrically with the axis of rotation, and at least one multi-step planet gear mounted on the planet gear carrier for rotation, a sun gear corresponding to and meshing with each of the steps the planet gear, each sun gear being mounted on the hub shaft for rotation about the axis of rotation and being adapted to be selectively coupled to the hub shaft against rotation about the axis of rotation in a respective axial speed-engagement position, and an internal gear mounted within the wheel hub sleeve for rotation about the axis of rotation, which internal gear meshes with one step of the planet gear;

coupling means for selectively coupling the driver with the planet-gear carrier or with the internal gear; and a speed-changing mechanism for the hub speed-changing transmission, the speed-changing mechanism being mounted for movement relative to the hub shaft, the method comprising the following steps:

pushing the mounting ring onto the hub shaft;

pushing the sun gears onto the hub shaft until they stop against the mounting ring; and pushing the planet gear carrier with said at least one planet gear installed thereon onto the hub shaft.

* * * * *

UNITED STATES PATENT AND TRADEMARK OFFICE
CERTIFICATE OF CORRECTION

PATENT NO. : 5,399,128
DATED : March 21, 1995
INVENTOR(S) : Günther Nürnberger

It is certified that error appears in the above-indentified patent and that said Letters Patent is hereby corrected as shown below:

```
Col. 4, line 4, "on" should read --one--;
Col. 7, line 42, "25/3" should read --25/1--;
Col. 10, line 45, "steps" should read --steps of--;
Col. 12, line 34, "steps" should read --steps of--;
Col. 14, line 2, "steps" should read --steps of--.
```

Signed and Sealed this

Third Day of October, 1995

Attest:

BRUCE LEHMAN

Attesting Officer

Commissioner of Patents and Trademarks